United States Patent [19]
Wilkinson et al.

[11] 4,421,105
[45] Dec. 20, 1983

[54] THERMAL CONTROL METHOD

[75] Inventors: Calvin L. Wilkinson, Renton; Christopher G. Shaw, Redmond, both of Wash.

[73] Assignee: The Boeing Company, Seattle, Wash.

[21] Appl. No.: 272,401

[22] Filed: Jun. 10, 1981

[51] Int. Cl.³ .............................................. F23J 3/02
[52] U.S. Cl. .................................. 126/452; 126/419; 126/422
[58] Field of Search ............... 126/422, 438, 439, 441, 126/452; 350/331 T, 331 R, 330, 349, 346, 351; 252/299.1

[56] References Cited
U.S. PATENT DOCUMENTS

| | | | |
|---|---|---|---|
| 4,083,356 | 4/1978 | Rajagopal | 126/422 |
| 4,232,949 | 11/1980 | Huffman | 350/349 |
| 4,268,126 | 5/1981 | Mumford | 350/331 R |
| 4,278,328 | 7/1981 | Mukoh et al. | 350/349 |

*Primary Examiner*—Samuel Scott
*Assistant Examiner*—Carl Price
*Attorney, Agent, or Firm*—William C. Anderson

[57] ABSTRACT

Method for controlling the temperature of a thermally sensitive body (10) exposed to visible and near-visible radiant energy (14) through the use and control of an electric field imposed on a liquid-crystal based material (20) capable of having a cholesteric-nematic phase transition with pleochroic dyes (32) mixed within the liquid-crystal based material (20).

2 Claims, 4 Drawing Figures

THERMAL CONTROL METHOD

TECHNICAL FIELD

This invention relates to a method of thermal control using an electrically-responsive controlling device to selectively reflect or absorb incident radiant energy in the visible and near-visible spectrum.

BACKGROUND OF THE INVENTION

It is often desired to control the thermal effect of incident radiative energy upon a given surface. For example, in the field of space satellites, it is often desirable, if not necessary, to control the absorption of radiant energy from the sun, earth, or other energy sources by thermally sensitive equipment disposed within the satellite. It may also be desirable to have given surfaces of the satellite absorb incident radiant energy at times and reflect this radiant energy at other times. Earth-based applications can be envisioned where temperature control is desired for surfaces exposed to radiant energy from the sun, blast furnaces, open flames, nuclear sources, etc.

Prior attempts at solving the problem of the thermal effects of incident visible and near-visible radiant energy (also referred to herein as "light") are exemplified by U.S. Pat. No. 3,341,274 issued Sept. 12, 1967 to Marks. In Marks, cells comprising dipole particles carried in a fluid suspension are capable of permitting the passage or reflection of light as a result of the alignment of the dipole particles through the imposition of an electrical field or disorientation of the dipole particles by the removal of the electrical field. If desired, light may pass through the suspension of dipole particles and strike a light absorbing body.

A serious problem with the use of the cells of Marks is the agglomeration of the particles. Particle agglomeration tends to remain more or less permanently even though the electrical field is removed. Such agglomeration considerably impairs the usefulness of the cells for various reasons.

A solution to particle agglomeration has been set forth in U.S. Pat. No. 3,655,267 issued Apr. 11, 1972 to Forlini. In Forlini, agglomeration for long periods of time may be precluded by using a radio-frequency energizing electrical field. Unfortunately, high radio frequencies (e.g., greater than 325 Kilohertz) would be inappropriate under certain circumstances thereby reducing the usefulness of the Forlini cells.

BRIEF SUMMARY OF THE INVENTION

The present invention provides a method for controlling the temperature of a body exposed to light in which a liquid-crystal assembly containing a liquid crystal based material, capable of having a cholesteric-nematic phase transition with pleochroic dyes, is placed in contact with the body. The temperature of the body is continuously sensed and, when the body is subjected to an increase in temperature or when a temperature decrease is desired, an electric field is imposed upon the liquid-crystal based material to force it into a nematic phase whereby the input of radiant energy to the body may be minimized. In the event that the body is sensed as having a decrease in its temperature or a temperature increase is desired, the electric field is removed in order to allow the liquid-crystal based material to relax into a cholesteric phase whereby the input of radiant energy to the body may be maximized.

DETAILED DESCRIPTION OF THE INVENTION

Figure 1:
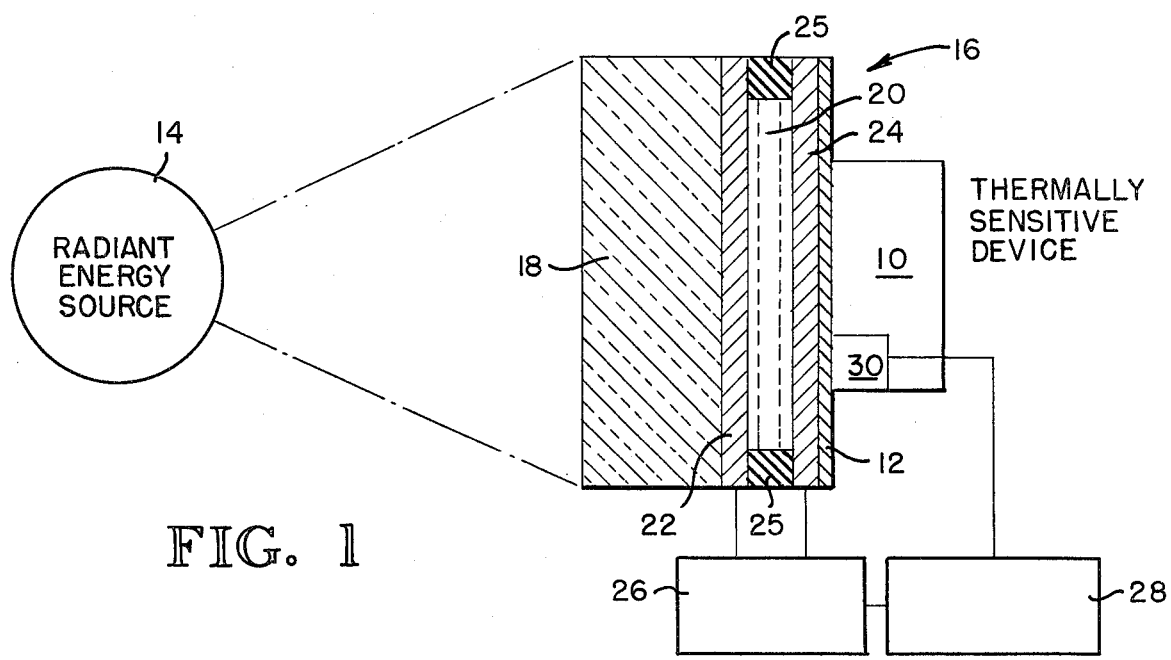
FIG. 1 is a cross-sectional view of a generalized schematic of an apparatus that may be used to perform the preferred embodiment of the method of the present invention.

The following views illustrate applications of the preferred embodiment of the method of the present invention wherein like reference characters depict the same or similar elements. In particular, FIG. 1 shows a thermally sensitive device 10 attached to a mounting surface 12 exposed to light or radiant energy from a source 14 which may be either the sun, the earth, the moon, or any other source.

A liquid-crystal assembly or a cell 16 is shown as being attached to the surface 12 and to a transparent envelope 18. The envelope 18 may be flexible allowing conformity of the cell to structurally complex mounting surfaces or shapes. The cell 16 comprises a known liquid-crystal based material, described hereinafter, sandwiched between a thin transparent conductive coating or an electrode 22 and a thin highly reflective coating or an electrode 24. The electrode 24 may be constructed of highly reflective aluminum or silver and the thin transparent conductive coating 22 may be made of indium-tin oxide. A sealing means 25 may be used to effectively seal the liquid-crystal based material 20 between the electrodes 22 and 24.

A power supply 26, capable of applying a voltage across the electrodes 22 and 24, is controlled by a conventional decision-making system or a switching circuit 28. The circuit 28 receives an electrical signal, representative of the temperature of the thermally sensitive device 10, by means of a conventional sensing means 30. Optionally, sensing means 30 may sense the temperature of the mounting surface 12 or other surface. When appropriate, the circuit 28 activates the power supply 26, whereby a voltage is applied across the electrodes 22, 24 and an electrical field is imposed upon the liquid-crystal based material 20, as will be better understood hereinafter. This switching circuit 28 may incorporate other decision-making logic to respond to a requirement to warm up or cool down the mounting surface 12 as desired (for instance, after a prolonged inactive period) and may optionally be switched on by a command from a local or remote control unit (not shown).

Figure 2A:
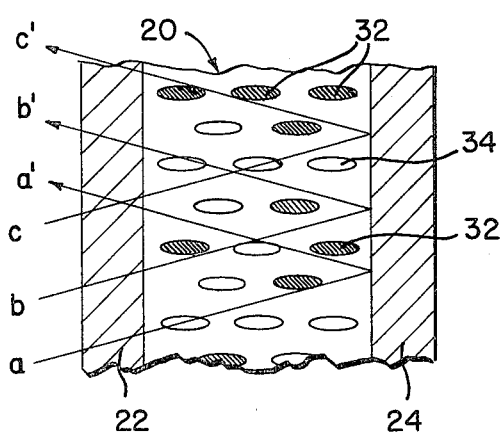
FIGS. 2A and 2B are partial cross-sectional views of a liquid-crystal assembly, useful in the present invention, in the nematic and cholesteric states, respectively.
Figure 2B:
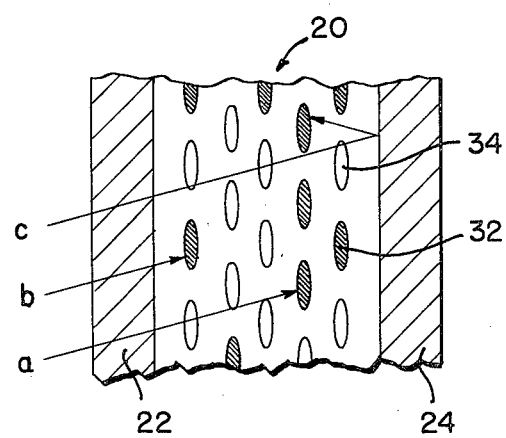

The liquid-crystal based material useful in the method of the present invention is capable of having a cholesteric-nematic phase change which reorients constituent pleochroic dyes upon the application and removal of an electric field induced within the liquid-crystal based material 20. As shown in FIGS. 2A and 2B, the liquid-crystal based material comprises a plurality of radiant energy absorbing dye molecules 32 randomly mixed with a plurality of liquid-crystal host material molecules typified with the numeral 34. For the purposes of illustration only, the number of the molecules 32, 34 is shown as approximately equal in number. However, it is well known that in conventional liquid-crystal based materials, the number of the molecules 34 is greater than the number of the molecules 32.

An example of the liquid-crystal host material useful in the present invention is cyanobiphenyl/terphenyl mixture E7. Pleochroic dyes based on the known anthraquinone skeleton are useful. The dyes preferably should have an order parameter greater than 0.65 and should be photochemically and electrochemically stable. Suitable pleochroic dye molecules and liquid-crystal host materials are described in greater detail by E. P. Raynes in an article entitled "Recent Advances in Liquid Crystal Materials and Display Devices" which appeared in the Conference Record of the IEEE-sponsored 1978 Biennial Display Research Conference held in Cherry Hill, N.J., Oct. 24–26, 1978.

In use, when the switching circuit 28 receives an electrical signal from the sensing means 30 indicating that the thermally sensitive device 10 is experiencing a rise in temperature due to the absorption of radiant energy from the source 14 or it is desired to reduce the temperature of the device 10, the power supply 26 is activated and a voltage is applied across the electrodes 22 and 24, thereby inducing an electric field within the liquid-crystal based material 20. With an electric field applied, the liquid-crystal based material 20 is forced into a nematic state and the dye molecules 32 are oriented so that there is little absorption of incident radiant energy or light, as shown in FIG. 2A. As can be seen in that figure, incident light rays a, b, c substantially pass through the liquid-crystal based material 20 and are reflected off the highly reflective coating or electrode 24 as reflected rays a', b', and c'.

When the switching circuit 28 determines that the thermally sensitive device 10 is undergoing a drop in temperature or it is desired to increase the temperature of the device 10, the power supply 26 is inactivated and no voltage is applied across the electrodes 22 and 24 resulting in the removal of the electrical field within the liquid-crystal based material 20. With a zero voltage, the liquid-crystal based material is in a cholesteric state and the dye molecules 32 absorb substantially all of the incident light or radiant energy. More specifically, in FIG. 2B, rays a, b and c are either directly absorbed or are absorbed after reflection off the highly reflective electrode 24.

As can be seen, the method of the present invention uses a known liquid-crystal based material to either absorb or reflect incident light or radiant energy in response to the sensing of a temperature rise or drop of a thermally sensitive device or other commands as desired. The method of the present invention is applicable to earth satellite systems or any other spacecraft and may be applied, as exemplified in FIG. 3, to a number of terrestrial and extra-terrestrial applications.

Figure 3:
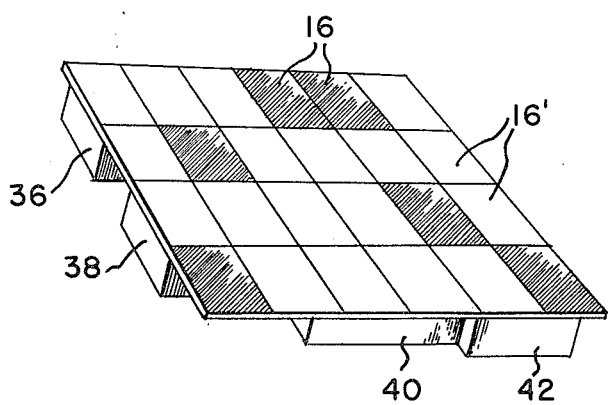
FIG. 3 depicts an application of the method of the present invention wherein a mosaic of liquid-crystal cells is used.

In FIG. 3, a plurality of thermally sensitive devices 36, 38, 40 and 42 are shown as being thermally controlled by a plurality of liquid-crystal assemblies or cells designated 16, 16' for a purpose which will be understood. The cells 16, 16', disposed in a matrix or as a mosaic, are controlled by a suitable control system (not shown) comparable to the control system illustrated with respect to FIG. 1. As can be seen, the cells 16 are shown as being shaded while the cells 16' are shown unshaded. The shaded cells 16 are intended to represent the event when the liquid-crystal based material 20 is in its absorb mode or cholesteric state. The white or unshaded cells 16' are intended to represent the cells in their reflective mode or nematic state.

As can be readily understood, the mosaic of the cells 16, 16', may be used to selectively and efficiently control the temperature of the devices 36, 38, 40, and 42. As temperature demands change, the cells can be selectively controlled to be in either the absorb or reflect mode to provide a desired temperature pattern for the devices.

While the present method has been described as being useful with respect to spacecraft, the method is applicable in any environment where it is desired to control the thermal absorption of radiant energy in the visible and near-visible spectrum.

What is claimed is:

1. A method for controlling the temperature of a radiant energy absorbing body exposed to radiant energy utilizing an assembly means containing a liquid-crystal-based material, said material being capable of having a cholesteric-nematic phase transition with pleochroic dyes, said method comprising:

disposing said assembly means in contact with said body, sensing the temperature of said body, imposing an electric field upon said liquid-crystal-based material in response to an increase in the temperature of said body to force said liquid-crystal-based material into a nematic phase whereby the absorption of radiant energy by said body may be minimized, removing said electric field in response to a decrease in the temperature of said body to allow said liquid-crystal-based material to relax into a cholesteric phase whereby the absorption of radiant energy by said body may be maximized.

2. A method for increasing or decreasing the temperature of a radiant energy absorbing body exposed to radiant energy utilizing an assembly means containing a liquid-crystal-based material, said material being capable of having a cholesteric-nematic phase transition with pleochroic dyes, said method comprising:

placing said assembly means in contact with said body between said body and said radiant energy, sensing the temperature of said body, imposing an electric field upon said liquid-crystal-based material when it is desired to reduce the temperature of said body, removing said electric field when it is desired to increase the temperature of said body.

* * * * *